Patented Mar. 9, 1943

2,313,588

UNITED STATES PATENT OFFICE 2,313,588

PARASITICIDE COMPOSITION AND METHOD OF PRODUCING THE SAME

Frank J. Seibert and Louis C. Roller, Bound Brook, N. J., assignors to Chipman Chemical Company, Inc., Bound Brook, N. J., a corporation of New York No Drawing. Application April 14, 1941, Serial No. 388,496

20 Claims. (Cl. 167—14)

This invention relates to a parasiticidal composition and method of producing the same and more particularly to a parasiticide containing fungicidal and/or insecticidal components and which is co-precipitated with an inert diluent to form a homogeneous unitized composition.

In accordance with the invention, the new parasiticide comprises the reaction product of a soluble sulfate of a heavy metal, an oxide or oxy acid of arsenic, and an oxide or hydroxide of an alkaline earth metal, the sulfate of which is insoluble, reacted in such proportions as to produce essentially a heavy metal salt of an oxy acid of arsenic and an alkaline earth sulfate, both co-precipitated as a single entity to form a homogeneous composition the ingredients of which do not exist as recognizable separate phases. In the preferred embodiment of the invention, the sulfate of the heavy metal is copper sulfate, and the alkaline earth compound is lime, since these materials are economical and readily available, and the resulting product possesses a good parasiticidal action. In the further description of the invention, copper will be referred to as illustrative of the heavy metals and calcium as illustrative of the alkaline earths, but only for convenience and as the equivalent of the heavy and alkaline earth metals mentioned generically and hereinafter enumerated more specifically. The arsenic may be utilized in any form, but for commercial purposes the trivalent and pentavalent arsenic oxides and acids are of significance.

Many attempts have been made heretofore to combine copper and arsenic. One such combination has long been known under the name "Paris green" which is essentially a cupric aceto-arsenite. It is prepared by reacting copper sulfate, arsenious acid, acetic acid and sodium carbonate or hydroxide. "Paris green" is almost universally used in preference to copper arsenites per se because the latter are quite variable in composition and difficult to handle during their manufacture. For this reason, the acetic acid is included to form the aceto-arsenite which is produced as a compound of crystalline character which may be filtered and otherwise readily handled. "Scheele's green" in the form of $CuHAsO_3$, and other forms of copper combined with trivalent arsenic, are well known as chemical compounds, but they are illustrative of the arsenities per se which have not found a practical use as parasiticides. In general the copper arsenites of all of these forms also have been regarded as too highly injurious to plant life, probably because of the soluble characteristics of the arsenic content.

In one attempt to overcome these disadvantages, for example, it has been proposed to react a mixture of "Paris green," calcium arsenate and an excess of free lime for the purpose of modifying the properties of the "Paris green." But this composition contains a large proportion of calcium arsenate and hydrated lime and requires the relatively expensive "Paris green" as a starting material.

Similarly, copper compounds of pentavalent arsenic, such as copper arsenate, have been known but compounds of this form have not had any marked acceptance as parasiticides.

The failure of the copper arsenites or arsenates to find acceptance as such or in the forms available for use in the parasiticidal field is probably due at least in part to expensive methods of manufacture and the form in which the copper arsenic compound exists. This is explained by the fact that the known commercial methods of preparation consist in precipitating the copper-arsenic compounds from solutions of soluble copper salts by the addition of a solution of sodium arsenite or arsenate, the latter resulting from the neutralization of the arsenic-containing acid with either soda ash or caustic soda. The sodium salts resulting from the reaction with the copper salts can not be recovered economically and in addition must be removed from the copper-arsenic product as their presence may cause injury to the foliage; they are also undesirable as an ingredient of the parasiticide because of their effect upon the physical character of the composition. Other methods of preparation involve similar losses of sodium salts either directly or indirectly, or require expensive raw materials, apparatus and treatment.

In accordance with another prior art proposal, it has been suggested that copper sulfate, arsenious acid, and calcium oxide may be reacted together with acetic acid to form a copper acetoarsenite. This composition is essentially of the Paris green type in that it is an aceto-arsenite of copper.

It has also been proposed to mix calcium oxide, arsenic or arsenious acid and hydrated copper sulfate, but with such proportions of water that all of the added water, plus water from the copper sulfate crystals, is absorbed in hydrating the calcium oxide, and the mixture is pulverant throughout the entire reaction. The final product, therefore, does not contain a copper-arsenic compound but contains a calcium arsenite or arsenate, hydrated lime and dehydrated copper sulfate.

It has not been proposed in the prior art, as far as we are aware, to prepare a parasiticide in which the copper compound is essentially a copper arsenite or arsenate by a method in which the arsenic is combined with the copper and in which lime is used to replace soda ash or caustic soda and calcium remains in the final product as a sulfate which functions as a diluent in intimate combination with the copper-arsenic compound.

It is an object of this invention, therefore, to provide a new parasiticidal composition containing copper combined with arsenic which has improved parasiticidal properties and a minimum harmful action to plant life.

An object of the invention is to provide a parasiticidal composition containing copper and arsenic combined chemically in a compound that is formed integrally with and in homogeneous and intimate association with an inert diluent.

It is a further object of the invention to provide a simple and economic method of producing the same.

A further object of the invention is to provide a new method of producing the new parasiticidal composition containing copper combined with trivalent or pentavalent arsenic or both in which the proportions of the copper-trivalent arsenic and copper-pentavalent arsenic compounds may be varied within wide limits with respect to each other as well as to the total copper and arsenic content of the final product.

Still a further object of the invention is to provide a method of producing a parasiticidal composition containing copper and arsenic chemically combined in compounds which are co-precipitated homogeneously with and upon an alkaline earth sulfate diluent to provide directly a homogeneous and unitized product.

An additional object of the invention is to provide a method in which lime, either anhydrous or hydrated, may be substituted for at least a part of the soda heretofore utilized, and retained in the composition to form a final calcium compound which is a desirable ingredient of the final composition, thus accomplishing a substantial saving in the cost of alkali and reducing or eliminating the necessity for removing alkali salts.

Other objects of the invention will become apparent to those skilled in the art from the following description.

Before proceeding with a more detailed description of the method by which the new parasiticide is formed, it is well to consider the chemistry involved and the probable reactions of the ingredients.

The theoretical reactions representing the combination of copper sulfate, hydrated lime and arsenious acid would be as follows:

$3CuSO_4.5H_2O + 2H_3AsO_3$ or
$As_2O_3.3H_2O + 3Ca(OH)_2 =$
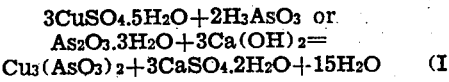  (I)

or $4CuSO_4.5H_2O + 2H_3AsO_3$ or
$As_2O_3.3H_2O + 4Ca(OH)_2 =$
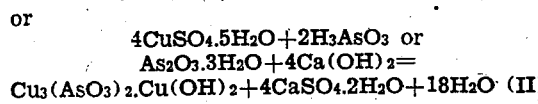 (II)

From the above reactions it will be seen that either the tricupric arsenite or basic tricupric arsenite may be formed or a mixture of the two compounds may be formed, depending upon the amount of copper sulfate and lime employed. In general, the basic compound, in the case of copper, is more readily obtained since it is the type compound which results when the acid ingredients and alkaline ingredients are approximately neutralized. In commercial practice, also, a slight excess of lime facilitates the reaction, and this tends to stabilize the basic compound phase.

Similar theoretical reactions for the formation of the arsenate from copper sulfate, arsenic acid and lime would be as follows:

$3CuSO_4.5H_2O + 2H_3AsO_4.\frac{1}{2}H_2O$ or
$As_2O_5.4H_2O + 3Ca(OH)_2 =$
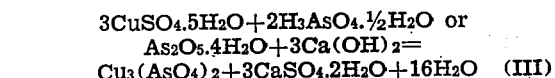   (III)

or $4CuSO_4.5H_2O + 2H_3AsO_4.\frac{1}{2}H_2O$ or
$As_2O_5.4H_2O + 4Ca(OH)_2 =$
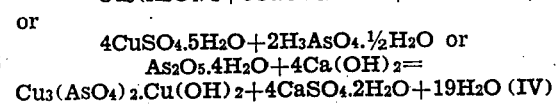 (IV)

In the above reactions, it will be noted that the arsenic acid has been referred to as $H_3AsO_4$, but the salts of other forms of arsenic acid are to be included, i. e., $H_4As_2O_7$ and $HAsO_3$, which can be regarded merely as forms of arsenic pentoxide combined with different amounts of water. Similarly, in the case of arsenious acids, the salts may be of acids other than $H_3AsO_3$, such as $H_4As_2O_5$ or $HAsO_2$ since these can be regarded as different forms of arsenic trioxide in combination with different amounts of water.

It will be apparent that either the arsenite or the arsenate in either the trimetallic or basic trimetallic forms may be obtained in a substantially similar manner. Mixtures of any of these four ingredients may be prepared depending upon the arsenic-containing acid utilized as the starting material and the proportions. In addition, the arsenic-containing acid may be oxidized or reduced from the trivalent to the pentavalent form or vice versa depending upon the conditions maintained during the reaction so that mixtures may be obtained in this manner.

It will be apparent that these reactions form a compound in which the arsenic is combined with the copper to form a compound that is coprecipitated with the calcium as sulfate, these two being the essential ingredients formed.

It has been found that hypothetical reactions of the type proposed above or combinations thereof actually may be made to proceed, resulting essentially in the formation of a compound of copper with trivalent or pentavalent arsenic, or both, homogeneously co-precipitated with or upon crystalline calcium sulfate. The resulting products are very fine powders, green to bluish-green in color and in which the several ingredients, if not in fact chemically combined are so closely associated physically as to appear and act as a single entity. The new products are relatively low in water soluble arsenic, particularly in the case of arsenites when compared to other forms of arsenite heretofore known, and have the correct physical characteristics for a parasiticidal composition.

The final composition may contain a relatively small amount of calcium arsenate or arsenite but this will be inconsequential since substantially all of the arsenic is combined in the copper compound. The final product may also contain a relatively small amount of free hydrated lime since as explained, it is desirable under many circumstances to have a slight excess of lime in order that the reaction may be expedited, and for practical purposes it is not essential to remove such a slight excess of lime from the final product after the reaction is complete. If desired, an additional amount of lime and arsenic may be added in the correct proportions so as to react to form lime arsenite or arsenate. This, however, may be regarded as a side reaction that does not interfere or modify the principal reaction described above.

The following examples are given as illustrative of the invention, but it is to be understood that the invention is in no way limited thereby or thereto, since it will be obvious to those skilled in this art that many variations may enter into the process and product. For example, the actual quantities of the materials used, i. e., a slight excess of any of the ingredients, particularly, if enough lime is used to cause free lime to be present in the final product; the degree, extent and application-point of heating; the quantity of water used; the rates of addition and extent of agitation; length of time the ingredients are permitted to react; the method of drying; etc., all will produce small variations in the color, physical characteristics and analysis of the product. All such variations may be practiced without departing from the invention as described heretofore and illustrated in the following examples:

*Example I*

Three grams of commercial (high-calcium) hydrated lime is suspended in 50 cc. of water and heated to boiling. Two grams of 99% $As_2O_3$ is added and boiling continued for one-half hour. To this mixture is added rapidly 10 grams of 99% hydrated copper sulfate crystals dissolved in 100 cc. of water. The mixture is constantly agitated during the addition. The resulting supernatant liquor is acid and the reaction may be terminated at this point, but it is preferred to add hydrated lime in small portions until a slight permanent alkalinity remains in the liquor. A total of about 1 gram of hydrated lime is required. The mixture is then heated to boiling, following which it may be evaporated to dryness at a temperature of about 180° F. in order to avoid loss of water from the crystalline calcium sulfate.

An analysis of the product shows it to contain basic tricupric arsenite, 30.75% to 31.75%; basic tricupric arsenate, 7.75–8.75%; and hydrated calcium sulfate $CaSO_4.2H_2O$, 50 to 52%. The balance of the composition comprises a small amount of hydrated lime, other calcium and/or arsenic compounds, water, impurities and inert materials.

It will be noticed in accordance with this example that the product contains an appreciable amount of arsenic in the pentavalent form (basic tricupric arsenate), although only arsenic in the trivalent form ($As_2O_3$) is used in producing it. This results from the fact that in alkaline solutions, particularly when heat is applied, arsenious acid is oxidized to arsenic acid and cupric compounds reduced to the cuprous form. Access to air permits reoxidation of the cuprous compounds and permits the arsenic oxidation cycle to continue. When the process is carried out under such conditions of alkalinity and temperature control as to minimize oxidation, the product will consist essentially of a copper-arsenic compound in which the arsenic is in the trivalent form.

It follows that by regulating the conditions of time, alkalinity, temperature, method of mixing and exposure to air, a product at either of the extremes may be obtained, i. e., one containing substantially all of the arsenic in the trivalent form or one containing the arsenic in the pentavalent form. The mixture, however, is a commercially acceptable product and in the industrial application of the invention it is unlikely that the precautions required to achieve only the arsenite will be observed.

It will also be apparent that the method of the invention provides a direct process of producing pentavalent arsenic in combination with copper from trivalent arsenic as the starting material, thus eliminating either the usual preliminary oxidation, or the introduction of an outside oxidizing agent which might be detrimental to the product or require further processing for the removal of the same. However, if it is desired to accelerate the oxidation, a suitable oxidizing agent may be used.

If it is desired to prevent the formation of the pentavalent arsenic compound a suitable reducing agent may be used.

*Example II*

Commercial (high-calcium) hydrated lime in an amount of 18.43 grams is suspended in 200 cc. of water and heated to boiling. One gram of 99% $As_2O_3$ is added and boiling continued for one-half hour. To this mixture is rapidly added 300 cc. of a water solution containing 50.45 grams of 99% hydrated copper sulfate crystals and 15.61 grams of 81.86% arsenic acid. The resulting mixture showed an alkalinity in the supernatant liquor. The mixture may then be evaporated to dryness at 180° F.

Analysis of the product showed it to contain about 40% basic tricupric arsenate, 1 to 2% basic tricupric arsenite and 51 to 52% hydrated calcium sulfate, $CaSO_4.2H_2O$. The balance of the composition comprises a small amount of hydrated lime, other calcium and/or arsenic compounds, water, impurities and inert materials.

*Example III*

Commercial (high-calcium) hydrated lime in an amount of 18.43 grams is suspended in 200 cc. of water and heated to boiling. Three grams of 99% $As_2O_3$ is added and boiling continued for one-half hour. To this mixture is rapidly added 300 cc. of water containing 50.45 grams of 99% hydrated copper sulfate crystals and 12.14 grams of 81.86% arsenic acid. The resulting supernatant liquid is slightly acid. The reaction can be terminated at this point, but it is preferred to add small amounts of hydrated lime until a slight permanent alkalinity remains at which time all of the copper has reacted and is precipitated in the copper-arsenic compound. The mixture may then be heated to boiling, and evaporated by drying at 180° F.

Analysis of the product showed it to contain 32 to 33% basic tricupric arsenate, about 8% tricupric arsenite and about 51 to 52% hydrated calcium sulfate. The balance of the composition comprises a small amount of hydrated lime, other calcium and/or arsenic compounds, water, impurities and inert materials.

In Examples II and III, it will be noted that mixtures of arsenic and arsenious acid are utilized and that the final product contains arsenic in the trivalent and pentavalent forms corresponding to the proportions of the acids used. These proportions may be varied over many limits and the final product will reflect this variance.

A product that is predominantly or entirely the cupric arsenate may be prepared similar to any of the above examples by using pentavalent arsenic acid as the only arsenic containing raw material, as described in application Serial No. 388,497 filed of even date herewith.

In the above examples, the order in which the ingredients are added is not controlling and the arsenic-containing acid and copper sulfate may be mixed first followed by the addition of the lime, or the copper sulfate and the lime may first be reacted following which the arsenic-containing acid may be added.

In carrying out the processes described heretofore, it is desirable that the ingredients should remain in admixture for sufficient time to permit the reaction to go substantially to completion, since such reaction is not instantaneous under all conditions. An elevated temperature is not essential, but in commercial practice, however, in order that the reaction may be concluded as soon as possible, it is desirable to employ elevated temperatures.

It is important that sufficient water be present in admixture with the several ingredients in order to permit them to form a slurry. Since the water is later evaporated an excess is not required, but a sufficient amount is necessary to permit the reaction to proceed.

The drying temperature given in the examples is selected in order that the calcium sulfate may be dried without loss of its water of crystallization. But it may be dried at higher temperatures if this feature is not regarded as important. In fact, the copper and arsenic content of the final product may be increased to a limited extent, if desired, by increasing the temperature and/or time of drying, whereby all or part of the water of crystallization of the fully hydrated calcium sulfate is eliminated. In the examples given heretofore, which contain hydrated calcium sulfate in an amount from 50 to 52%, about 11% is combined water of crystallization. If this is eliminated, the copper and arsenic content of the total mixture can be increased from the range of 40 to 42% to about 45 to 47%.

The purity or concentration of the raw materials is not of significance, the materials mentioned in the examples merely being those which are readily available for practicing the invention.

It will be noted in accordance with all of the examples that the compound produced is the basic tricupric arsenite or arsenate such as disclosed heretofore in Reactions II and IV. As has been explained previously when all of the acid ingredients have been reacted with the alkaline ingredients, the basic salt is formed, in the case of copper. This is not necessarily true in the case of other metals. If desired, however, the amount of lime and metal may be decreased, and the compound of the type described in the Equations I and III will be formed. It will be readily apparent that by proportionately increasing and decreasing the amounts of lime and metallic sulfate with respect to the arsenic-containing acid, the neutral or basic salt may be formed or a mixture of them.

When the reaction is terminated on the alkaline side there will be a small amount of unreacted lime which remains in the composition. This ingredient, and to a lesser extent, the calcium sulfate, have a limited but appreciable solubility in water, and the copper-arsenic content of the composition may be increased by washing out any desired quantity of these two calcium compounds. For example, by repeated washing, it is possible to remove any free lime and any portion of the calcium sulfate. This can still be reduced further by removing the water of crystallization from any calcium sulfate remaining.

The content of copper and arsenic may also be increased, while practicing essentially the same process, by substituting an alkali metal alkaline compound, such as soda ash or caustic soda, for a part of the lime. The quantity of the calcium sulfate precipitated may thus be reduced by the amount that is replaced by soda. For example, if one-half of the lime is replaced by soda the diluent content will be reduced one-half but the manufacturing economy will be lost to a corresponding extent. The amount of lime replaced by soda should not be so large but that the final product contains a substantial portion of calcium sulfate diluent, whereby the advantages of the diluent in the final product and the economic advantages in manufacture are both retained. The sodium sulfate resulting is more readily removed by washing than the less soluble calcium sulfate, and the proportion of the copper-arsenic compound to calcium sulfate may thus be increased.

In the description of the invention heretofore, it is stated that any heavy metal or metals (other than copper) whose sulfate is soluble may be used to replace a part of all of the copper. The most important of these metals are aluminum, iron, magnesium, manganese, zinc and nickel. Others, currently more expensive, are cadmium, chromium, cobalt and tin.

In place of a part or all of the lime, the oxide or hydroxide of any metal may be used which forms any insoluble sulfate. Examples are barium and strontium oxides and hydroxides.

In addition to the advantages already pointed out, the invention possesses the advantage that the co-precipitation of the active parasiticide component of the composition with and upon the inert diluent eliminates any necessity later for mixing the active ingredient with an inert ingredient, which is now more or less the practice with most parasiticides used on various crops and plants. The invention also results in lower cost, and in a more uniform material in which all of the particles are identical in composition, as compared with the product resulting from the dry mixing of the active parasiticide ingredient with an inert diluent, which produces a mixture some particles of which are of high toxic value and potentially injurious to the plant, and other particles are of no effect whatever.

In addition, the different arsenites and arsenates formed in accordance with the process, and particularly the different metals when more than one heavy metal is used, each of which have variable physical and parasiticidal characteristics, are co-precipitated in the manner disclosed to form a product each particle of which has the average of these characteristics so that the product is essentially one in which all of the particles have a similar property. These advantages are believed to result in a reduction of the total amount of arsenic required for a given condition and to provide an acceptable substitute for lead compounds whereby the known hazards of cumulative lead poisoning in the system will be eliminated.

As has been described heretofore, the invention includes many variations in the materials used, reaction conditions and other factors, all of which are to be included as expressed in the following claims.

We claim:

1. A parasiticidal composition of matter comprised essentially of the reaction product of a sulfate of a metal, the sulfate of which is relatively water-soluble and the arsenite and arsenate of which are water-insoluble; an alkaline earth alkaline compound selected from the group consisting of oxides and hydroxides, the sulfate of which alkaline earth is relatively insoluble; and an arsenic compound selected from the group consisting of the oxides and oxy acids of arsenic; all of the above ingredients of said composition being mutually reacted in an aqueous slurry in such proportions and with an amount of alkaline earth compound sufficient that substantially all of the said metal is combined with the arsenic as an insoluble salt of an arsenic-containing acid which is co-precipitated from said slurry with the sulfate of the alkaline earth as a composition all of the particles of which are substantially uniform and homogeneous.

2. A composition of matter comprised essentially of the reaction product of copper sulfate, lime, and an arsenic compound selected from the group consisting of the oxides and oxy acids of arsenic, all of the above ingredients of said composition being mutually reacted in an aqueous slurry in such proportions and with an amount of lime sufficient that substantially all of the copper is combined with the arsenic as an insoluble salt of an arsenic-containing acid which is co-precipitated from said slurry with the calcium sulfate as a composition all of the particles of which are substantially uniform and homogeneous.

3. A composition of matter comprised essentially of the reaction product of copper sulfate, lime, and an arsenic compound selected from the group consisting of the oxides and oxy acids of arsenic, all of the above ingredients of said composition being mutually reacted in an aqueous slurry in such proportions and with an amount of lime sufficient that substantially all of the copper is combined with arsenic as the basic tricupric salt of an oxy arsenic-containing acid which is co-precipitated from said slurry with the calcium sulfate as a composition all of the particles of which are substantially uniform and homogeneous.

4. A composition of matter comprised essentially of the reaction product of a sulfate of a metal, the sulfate of which is relatively water-soluble and the arsenite of which is water-insoluble; an alkaline earth alkaline compound selected from the group consisting of oxides and hydroxides, the sulfate of which alkaline earth is relatively insoluble; and a trivalent arsenic compound selected from the group consisting of arsenious oxide and acids; all of the above ingredients of said composition being mutually reacted in an aqueous slurry in such proportions and with an amount of the alkaline earth compound sufficient that substantially all of the said metal is combined with the arsenic as an arsenite which is co-precipitated from said slurry with the sulfate of the alkaline earth as a composition all of the particles of which are substantially uniform and homogeneous.

5. A composition of matter comprised essentially of the reaction product of copper sulfate, lime, and a trivalent arsenic compound selected from the group consisting of arsenious oxide and acids; all of the above ingredients of said composition being mutually reacted in an aqueous slurry in such proportions and with an amount of lime sufficient that substantially all of the copper is combined with the arsenic as an arsenite which is co-precipitated from said slurry with the calcium sulfate as a composition all of the particles of which are substantially uniform and homogeneous.

6. A composition of matter comprised essentially of the reaction product of copper sulfate, lime, and a trivalent arsenic compound selected from the group consisting of arsenious oxide and acids; all of the above ingredients of said composition being mutually reacted in an aqueous slurry in such proportions and with an amount of lime sufficient that substantially all of the copper is combined with the arsenic as basic tricupric arsenite which is co-precipitated from said slurry with the calcium sulfate as a composition all of the particles of which are substantially uniform and homogeneous.

7. A composition of matter comprising an arsenite of a metal the sulfate of which is soluble, an arsenate of a metal the sulfate of which is soluble, and a sulfate of an alkaline earth metal the sulfate of which is insoluble, all co-precipitated as a composition of homogeneous and uniform particles.

8. A composition of matter comprising a copper arsenite, a copper arsenate, and calcium sulfate, all co-precipitated as a composition of homogeneous and uniform particles.

9. A composition of matter comprising basic tricupric arsenite, basic tricupric arsenate, and calcium sulfate, all co-precipitated as a composition of homogeneous and uniform particles.

10. A composition of matter comprising a copper arsenite, a copper arsenate, and hydrated calcium sulfate, all co-precipitated as a composition of homogeneous and uniform particles.

11. A method of producing a parasiticidal composition of matter which comprises reacting a sulfate of a metal, the sulfate of which is relatively water-soluble and the arsenite and arsenate of which are water-insoluble, an alkaline earth hydroxide the sulfate of which alkaline earth is relatively insoluble, and an arsenic compound selected from the group consisting of the oxides and oxy acids of arsenic, in an amount of water to form a slurry and in such proportions that the acid and alkaline constituents are substantially neutralized and substantially all of the said metal is combined with an arsenic-containing acid and co-precipitated from said slurry with the sulfate of the alkaline earth to form a composition the particles of which are uniform and homogeneous.

12. A method of producing a parasiticidal composition of matter which comprises reacting copper sulfate, lime, and an arsenic compound selected from the group consisting of the oxides and oxy acids of arsenic, in an amount of water to form a slurry and in such proportions that the acid constituents are substantially neutralized by the lime and substantially all of the copper is combined with the arsenic compound, whereby a copper salt of an arsenic-containing acid is co-precipitated from said slurry with calcium sulfate to form a composition the particles of which are uniform and homogeneous.

13. A method of producing a parasiticidal composition of matter which comprises reacting copper sulfate, lime, and an arsenic compound selected from the group consisting of the oxides and oxy acids of arsenic, in an amount of water to form a slurry and in such proportions and with an amount of lime sufficient to combine substantially all of the copper as a basic tricupric salt of the arsenic-containing acid which is co-precipitated from said slurry with calcium sulfate to form a composition the particles of which are uniform and homogeneous.

14. A method of producing a parasiticidal composition of matter which comprises reacting a sulfate of a metal, the sulfate of which is relatively water-soluble and the arsenite of which is water-insoluble, an alkaline earth hydroxide the sulfate of which alkaline earth is relatively insoluble, and a trivalent arsenic compound selected from the group consisting of arsenious oxide and acids, in an amount of water to form a slurry and in such proportions that the acid and alkaline constituents are substantially neutralized and substantially all of the said metal is combined with arsenious acid and co-precipitated from said slurry with the sulfate of the alkaline earth to form a composition the particles of which are uniform and homogeneous.

15. A method of producing a parasiticidal composition of matter which comprises reacting copper sulfate, lime, and a trivalent arsenic compound selected from the group consisting of arsenious oxide and acids, in an amount of water to form a slurry and in such proportions and with an amount of lime sufficient to combine substantially all of the copper as a basic tricupric arsenite which is co-precipitated from said slurry with calcium sulfate to form a composition the particles of which are uniform and homogeneous.

16. A method of producing a parasiticidal composition of matter which comprises reacting a sulfate of a metal, the sulfate of which is relatively water-soluble and the arsenite and arsenate of which are water-insoluble, an alkaline earth hydroxide the sulfate of which alkaline earth is relatively insoluble, a trivalent arsenic-containing compound selected from the group consisting of arsenious oxide and acids, and a pentavalent arsenic-containing compound selected from the group consisting of arsenic oxide and acids, in an amount of water to form a slurry and in such proportions that the acid and alkaline constituents are substantially neutralized whereby metal salts of arsenious and arsenic acid are precipitated from said slurry with the sulfate of the alkaline earth to form a composition the particles of which are uniform and homogeneous.

17. A method of producing a parasiticidal composition of matter which comprises reacting a sulfate of a metal, the sulfate of which is relatively water-soluble and the arsenite and arsenate of which are water-insoluble, an alkaline earth hydroxide the sulfate of which alkaline earth is relatively insoluble, and a trivalent arsenic-containing compound selected from the group consisting of arsenious oxide and acids, in an amount of water to form a slurry, and in such proportions that the acid and alkaline constituents are substantially neutralized at the end of the reaction; said reaction being carried out with the application of heat to the reacting ingredients and in the presence of alkalinity during the reaction so that at least a part of the trivalent arsenic-containing compound is converted by oxidation into a pentavalent arsenic-containing compound, whereby metal salts of arsenious and arsenic acid are precipitated from said slurry with the sulfate of the alkaline earth to form a composition the particles of which are uniform and homogeneous.

18. A method of producing a parasiticidal composition of matter which comprises reacting copper sulfate, lime, arsenious acid and arsenic acid, in an amount of water to form a slurry and in such proportions that the acid constituents are substantially neutralized by the lime whereby a copper arsenite and arsenate are co-precipitated from said slurry with calcium sulfate to form a composition the particles of which are uniform and homogeneous.

19. A method of producing a parasiticidal composition of matter which comprises reacting copper sulfate, lime, and arsenious acid under oxidizing conditions, and in an amount of water to form a slurry and in such proportions and with an amount of lime sufficient to form basic tricupric arsenite and arsenate which are co-precipitated from said slurry with calcium sulfate to form a composition the particles of which are uniform and homogeneous.

20. A method of producing a parasiticidal composition of matter which comprises reacting copper sulfate, lime, arsenious acid, and arsenic acid, and in an amount of water to form a slurry and in such proportions and with an amount of lime sufficient to form basic tricupric arsenite and arsenate which are co-precipitated from said slurry with calcium sulfate to form a composition the particles of which are uniform and homogeneous.

FRANK J. SEIBERT.
LOUIS C. ROLLER.